United States Patent
Wing et al.

(10) Patent No.: US 12,120,226 B2
(45) Date of Patent: Oct. 15, 2024

(54) PREVENTING HTTP COOKIE STEALING USING COOKIE MORPHING

(71) Applicant: Citrix Systems, Inc., Fort Lauderdale, FL (US)

(72) Inventors: Daniel G. Wing, Truckee, CA (US); Ratnesh Singh Thakur, San Jose, CA (US); Arkesh Kumar, San Jose, CA (US); Raghukrishna Hegde, Milpitas, CA (US); Nivedita Jagdale, Santa Clara, CA (US); Ramachandra Kasyap Marmavula, Newark, CA (US); Joseph Hoelbrandt, Gilroy, CA (US); Girish Chandra Padhi, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 128 days.

(21) Appl. No.: 17/097,255

(22) Filed: Nov. 13, 2020

(65) Prior Publication Data
US 2022/0158831 A1 May 19, 2022

(51) Int. Cl.
*H04L 9/08* (2006.01)
*H04L 9/40* (2022.01)
*H04L 67/02* (2022.01)

(52) U.S. Cl.
CPC ........ *H04L 9/0861* (2013.01); *H04L 63/1466* (2013.01); *H04L 67/02* (2013.01)

(58) Field of Classification Search
CPC ... H04L 63/1466; H04L 67/02; H04L 9/0861; H04L 9/0891; H04L 9/3242
See application file for complete search history.

(56) References Cited

U.S. PATENT DOCUMENTS

| | | | | |
|---|---|---|---|---|
| 9,491,157 B1* | 11/2016 | Amdahl | ................... | H04L 67/56 |
| 10,225,255 B1* | 3/2019 | Jampani | ................... | H04L 63/12 |
| 2002/0169961 A1* | 11/2002 | Giles | ................... | G06F 21/6218 |
| | | | | 713/175 |
| 2009/0319776 A1* | 12/2009 | Burch | ..................... | H04L 63/08 |
| | | | | 713/168 |
| 2010/0306538 A1* | 12/2010 | Thomas | ................ | H04L 9/0891 |
| | | | | 713/168 |
| 2010/0306547 A1* | 12/2010 | Fallows | .............. | H04L 63/0815 |
| | | | | 713/178 |
| 2011/0154464 A1* | 6/2011 | Agarwal | ............. | H04L 63/0815 |
| | | | | 726/8 |
| 2014/0259109 A1* | 9/2014 | Houston | ................. | H04L 63/08 |
| | | | | 726/3 |

(Continued)

*Primary Examiner* — Daniel B Potratz
*Assistant Examiner* — Matthias Habtegeorgis

(57) ABSTRACT

Described embodiments provide systems and methods for morphing or regenerating validation information. A client can receive, via a device, an authentication cookie for access to a server. The device may maintain a sequence number and a cryptographic secret. The client may use the cryptographic secret and a cookie engine to generate validation cookie information with an updated sequence number. The client may send the authentication cookie to the device via a hypertext transfer protocol (HTTP) message to validate the authentication cookie. The client may send the validation cookie information with the updated sequence number to the device via a HTTP message to validate the authentication cookie.

24 Claims, 7 Drawing Sheets

(56) References Cited

U.S. PATENT DOCUMENTS

| | | | |
|---|---|---|---|
| 2015/0058493 A1* | 2/2015 | Adams | H04L 63/1475 |
| | | | 709/228 |
| 2018/0269963 A1* | 9/2018 | Li | H04B 10/032 |
| 2020/0007531 A1* | 1/2020 | Koottayi | H04L 67/146 |
| 2020/0242097 A1* | 7/2020 | Wu | G06F 16/215 |

* cited by examiner

PREVENTING HTTP COOKIE STEALING USING COOKIE MORPHING

FIELD OF THE DISCLOSURE

The present application generally relates to protecting validation information, including but not limited to systems and methods for morphing or regenerating validation information.

BACKGROUND

Certain communication protocols can execute one or more processes that are vulnerable to attempts to steal validation information. Some frameworks may provide protective mechanisms against said attempts. For example, one or more frameworks may require one or more entities to exchange the validation information while executing a process. At least one problem with said frameworks may be a failure to provide an equal level of protection to all processes of a communication protocol. Failing to provide equal levels of protections can result in a heightened level of exposure to hijacking or stealing attempts, providing an attacker with increased accessibility to sensitive information.

SUMMARY

This Summary is provided to introduce a selection of concepts in a simplified form that are further described below in the Detailed Description. This Summary is not intended to identify key features or essential features, nor is it intended to limit the scope of the claims included herewith.

The present disclosure is directed towards systems and methods for morphing or regenerating validation information (e.g., to prevent the validation information from being stolen and misused), in connection with a hypertext transfer protocol (HTTP) for instance. A server (e.g., a backend server supporting HTTPS) may generate/create/produce an authentication cookie for a client (e.g., a smartphone, a laptop, a tablet device, and/or a desktop computer of a user) that requests to access a service, application resource and/or network application. A device (e.g., a gateway module, a local/foreign node, and/or an application delivery controller) may identify/detect that the server (e.g., a backend server) has generated/created/produced the authentication cookie. Responsive to detecting the cookie has been generated, the device can protect/secure the authentication cookie by injecting/providing an executable code (e.g., a JavaScript or other executable codes) to the client. The executable code may provide/supply/include a cookie engine, an initial sequence number (for example, a randomized or default initial sequence number), a cryptographic secret (for example, a randomized initial sequence number), and/or other information. The device may have access to and/or independently generate the information provided/indicated by the executable code (e.g., the sequence number, the cryptographic secret, and/or other information).

Responsive to a HTTP request (or other message requests), the cookie engine may generate/create/produce validation cookie information (e.g., a fresh/morphed/additional cookie, a hash-based message authentication code (HMAC), and/or other information), different from the authentication cookie. The cookie engine may use the initial sequence number, the cryptographic secret, and/or other information to generate the validation cookie information. The cookie engine may increase/increment the sequence number by a defined value (e.g., by 1 or other values) responsive to generating the validation cookie information.

In one aspect, the present disclosure is directed to a method for morphing or regenerating validation information. The method can include receiving, by a client via a device, an authentication cookie for access to a server. The device may maintain a sequence number and a cryptographic secret. The client may use the cryptographic secret and a cookie engine to generate validation cookie information with an updated sequence number. The client may send the authentication cookie to the device via a hypertext transfer protocol (HTTP) message to validate the authentication cookie. The client may send the validation cookie information with the updated sequence number to the device via a HTTP message to validate the authentication cookie.

In some embodiments, the client may access executable code of the cookie engine via a prior HTTP message from the device. The client may use the cryptographic secret and the cookie engine to modify a cookie generated by the device into the validation cookie information. The validation cookie information may comprise a validation cookie. The client may use the cryptographic secret and the cookie engine to generate the validation cookie information. The validation cookie information may comprise a validation cookie. In some embodiments, the HTTP message may comprise a HTTP GET message, a HTTP INFO message, or a HTTP HEAD message.

In certain embodiments, the client may increment the sequence number by a defined value to generate the validation cookie information with the updated sequence number. The client may generate a respective validation cookie information with a respective updated sequence number using the cryptographic secret and the cookie engine. The client may generate the respective validation cookie information with the respective updated sequence number at each of a plurality of time instances. In some embodiments, a browser feature of the client may detect that the HTTP message is to be sent. Responsive to the detection, the client may generate the validation cookie information with the updated sequence number.

In some embodiments, the client may initiate a new secure connection. Responsive to the new secure connection, the client may receive a redirect from the device to the client. Upon or responsive to the redirect, the client may generate the validation cookie information with the updated sequence number. The client may store the updated sequence number in a local storage. After a page refresh, the client may access the updated sequence number from the local storage. The cookie engine may be pre-installed on the client. The client may receive a validation cookie and the sequence number from the device to generate the validation cookie information. The client may obtain a hash-based message authentication code (HMAC) of the validation cookie and the sequence number using the cookie engine. The client may obtain the updated sequence number by incrementing the sequence number. The device may be caused to validate the HMAC and the updated sequence number.

In certain embodiments, the device may be caused to remove the validation cookie information from the HTTP message responsive to successful validation of the authentication cookie. The device may be caused to communicate the HTTP message with the authentication cookie to the server, responsive to successful validation of the authentication cookie. The device may be intermediary between the client and the server.

In one aspect, the present disclosure is directed to a client for preventing validation information from being stolen by morphing or regenerating the validation information. The client may comprise at least one processor. The at least one processor may be configured to receive an authentication cookie for access to a server from a device. The device may maintain a sequence number and a cryptographic secret. The at least one processor may be configured to generate validation cookie information with an updated sequence number using the cryptographic secret and a cookie engine. The at least one processor may be configured to send the authentication cookie to the device via a hypertext transfer protocol (HTTP) message to validate the authentication cookie. The at least one processor may be configured to send the validation cookie information with the updated sequence number to the device via a hypertext transfer protocol (HTTP) message to validate the authentication cookie.

In some embodiments, the at least one processor may be configured to access executable code of the cookie engine via a prior HTTP message from the device. The at least one processor may be configured to generate the validation cookie information by modifying a cookie generated by the device. The at least one processor may be configured to modify the cookie generated by the device into the validation cookie information using the cryptographic secret and the cookie engine. The validation cookie information may comprise a validation cookie. The at least one processor may be configured to generate the validation cookie information using the cryptographic secret and the cookie engine. The validation cookie information may comprise a validation cookie.

In certain embodiments, the HTTP message may comprise a HTTP GET message, a HTTP INFO message, or a HTTP HEAD message. The at least one processor may be configured to generate the validation cookie information with the updated sequence number by incrementing the sequence number by a defined value. The at least one processor may be configured to generate a respective validation cookie information with a respective updated sequence number. The at least one processor may be configured to use the cryptographic secret and the cookie engine, at each of a plurality of time instances, to generate the respective validation cookie information with the respective updated sequence number.

In one aspect, the present disclosure is directed to a method for morphing or regenerating validation information. The method can include sending, by a device to a client, an authentication cookie for access to a server. The device may maintain a sequence number and a cryptographic secret. Validation cookie information with an updated sequence number may be generated at the client. The validation cookie information with the updated sequence number may be generated using the cryptographic secret and a cookie engine. The device may receive the authentication cookie from the client via a hypertext transfer protocol (HTTP) message. The device may receive the validation cookie information with the updated sequence number from the client via a HTTP message. The device may determine whether to validate the authentication cookie. The device may validate the authentication cookie according to the validation cookie information and the updated sequence number.

In some embodiments, the device may inject executable code of the cookie engine into another HTTP message. The device may send another HTTP message to the client. Responsive to initiation of a new secure connection at the client, the device may send a redirect to the client. The client may be caused to generate the validation cookie information with the updated sequence number via the redirect. The device may remove the validation cookie information from the HTTP message responsive to successful validation of the authentication cookie. The device may communicate the HTTP message with the authentication cookie to the server.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for morphing or regenerating validation information.

A. Network and Computing Environment

Figure 1A:
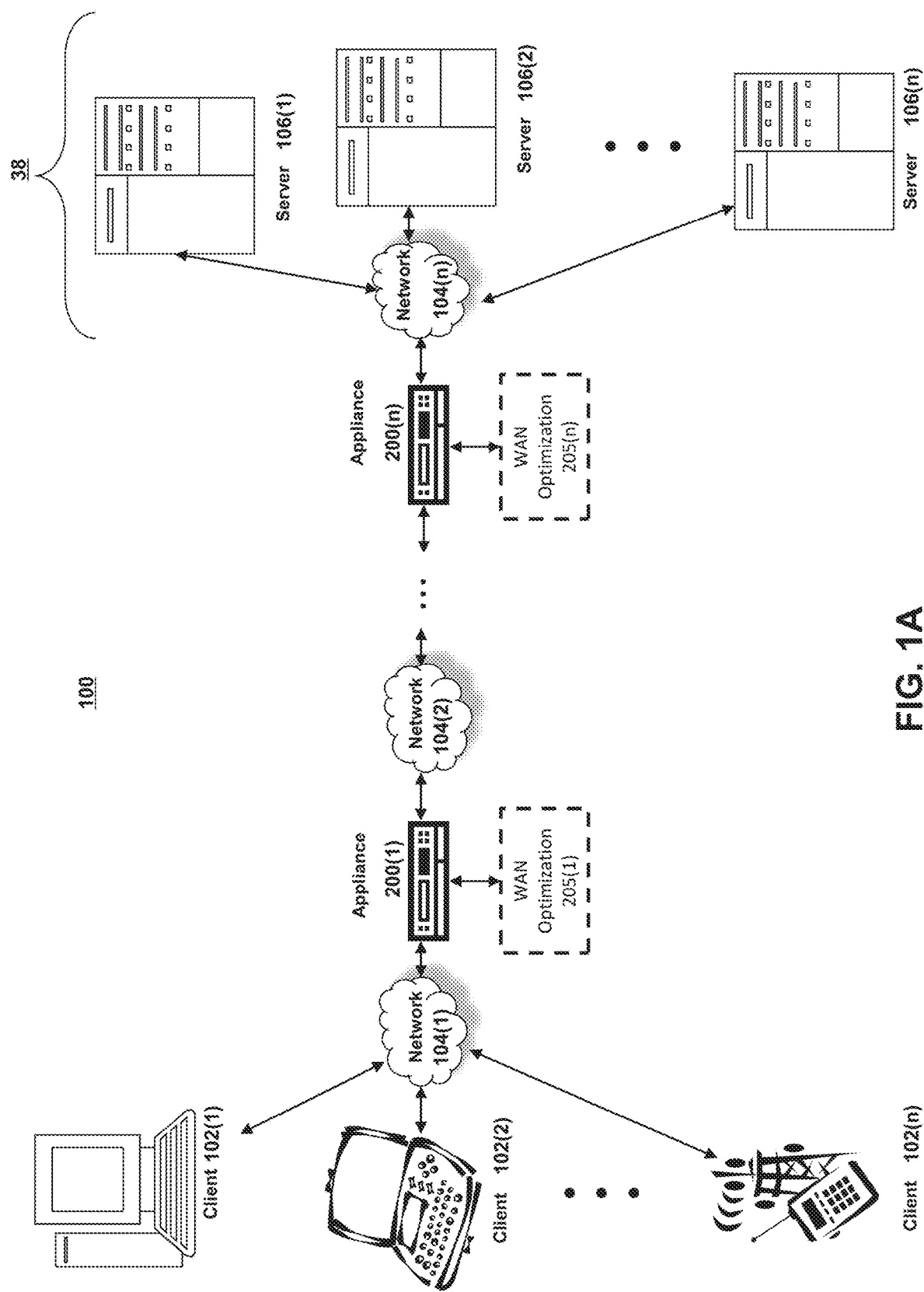
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, FL.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, FL.

Figure 1B:
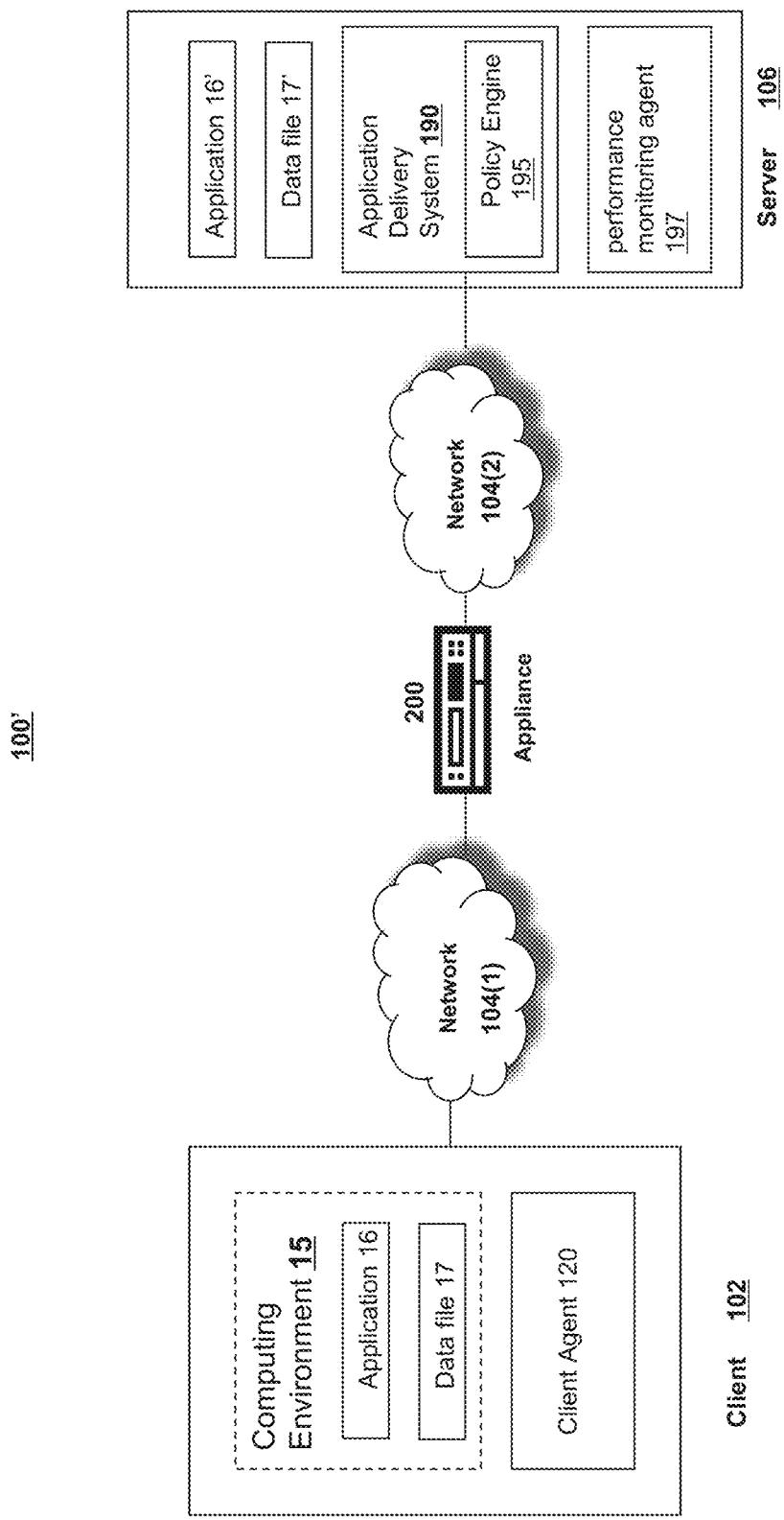
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, FL The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, FL.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
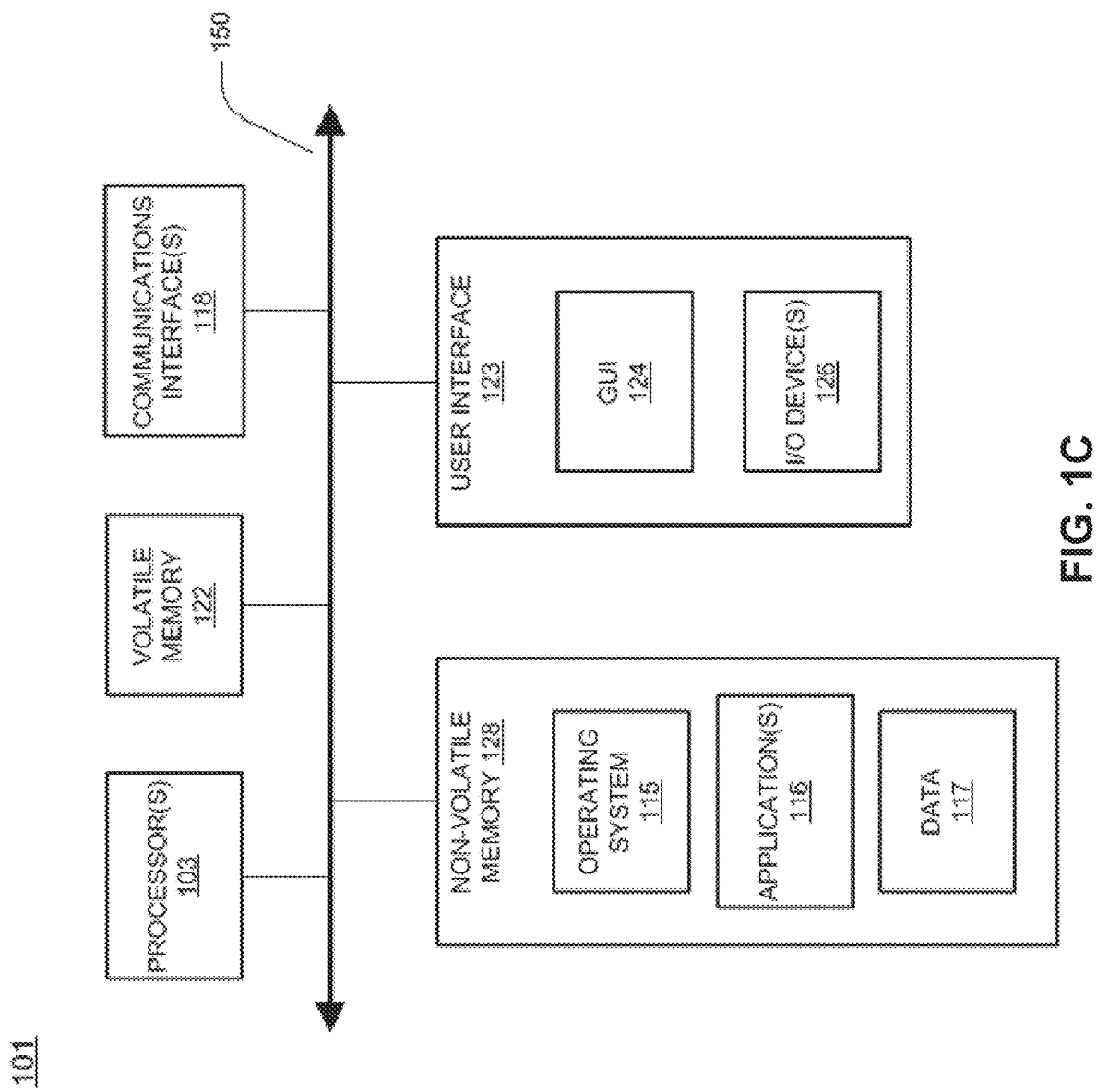
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, FL, the teachings of which are hereby incorporated herein by reference.

B. Appliance Architecture

Figure 2:
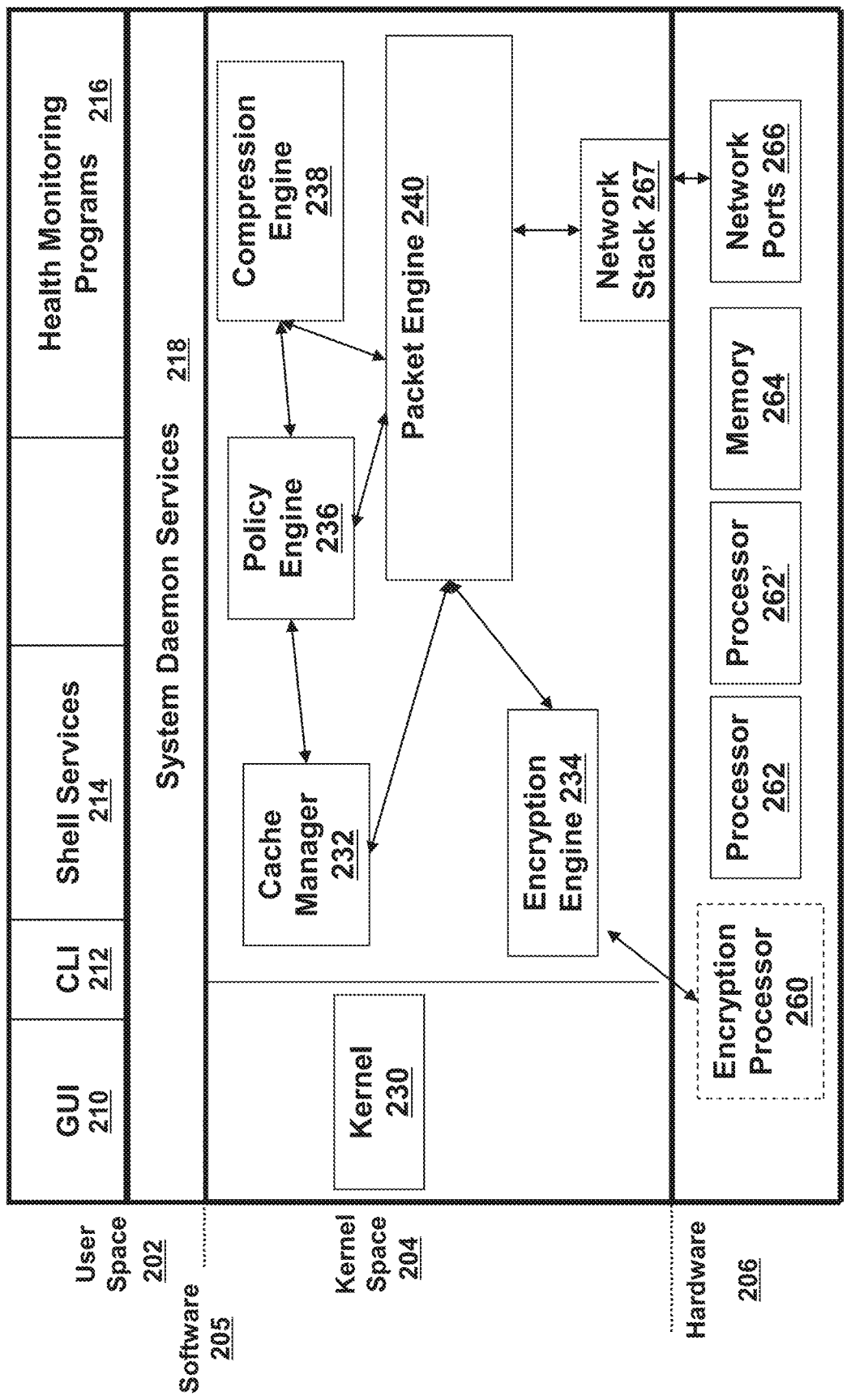
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, FL Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, FL, the teachings of which are hereby incorporated herein by reference.

C. Systems and Methods for Preventing Validation Information from Being Stolen

Certain communication protocols (e.g., hypertext transfer protocol (HTTP), hypertext transfer protocol secure (HTTPS), secure sockets layer (SSL), transport layer security (TLS), and/or other protocols) may use one or more methods (e.g., HTTP POST, HTTP DELETE, HTTP PUT, and/or other methods) that are vulnerable to attempts to steal validation information (e.g., the methods can be referred to as unsafe). Certain frameworks (e.g., HTTP frameworks, active server pages (ASP) frameworks, such as ASP.NET and/or other frameworks) and/or devices (e.g., a gateway module, a local/foreign node, and/or an application delivery controller (ADC)) may provide/include/implement protective mechanisms against stealing attempts. For example, an ADC and/or HTTP framework may be implemented to have a client (e.g., a smartphone, a laptop, a tablet device, and/or a desktop computer of a user) provide validation information (e.g., a cookie and/or additional information) with certain special data to a server (e.g., a backend server) while executing an unsafe method (e.g., HTTP POST or other methods). A failure to validate the validation information (e.g., due to an incorrect cookie), for example, would cause the transaction between the client and the server to fail.

At least one problem with these frameworks and/or devices may be a failure to provide/apply/supply an equal level of protection to other methods of the communication protocol (e.g., HTTP, HTTPS, and/or other protocols). For instance, certain devices (e.g., ADC) and/or frameworks (e.g., ASP.NET) can fail to apply/provide the same protective mechanisms of the unsafe HTTP methods, to safe HTTP methods (e.g., HTTP GET, HTTP INFO, HTTP HEAD, and/or other methods). For instance, safe HTTP methods such as HTTP GET may not be implemented to have the client send data (e.g., special data, similar to the protective mechanisms discussed above) to the server. Therefore, such HTTP methods may have a heightened level of exposure/ vulnerability to hijacking or stealing attempts on validation information such as cookies, providing an attacker with increased accessibility to sensitive information (e.g., an account number, an account balance, a home address, and/or other sensitive information).

The present disclosure is directed towards systems and methods for preventing validation information (e.g., validation cookie information, authentication cookies, and/or other information) from being stolen by morphing the validation information. A server (e.g., a backend server) may generate/ create/produce an authentication cookie (or other authentication/validation information) for a client (e.g., client supporting HTTPS, or other clients) that requests to access a service, application resource and/or network application. A device may identify/detect that the server has generated/ created/produced an authentication cookie. Responsive to detecting that the authentication cookie has been generated, the device can protect/secure/validate the authentication cookie by injecting/providing an executable code (e.g., a JavaScript or other executable codes) to the client. The executable code may provide/supply/include a cookie engine, an initial sequence number (for example, a randomized initial sequence number), a cryptographic secret (for example, a randomized initial sequence number), and/or other information. In some embodiments, a message/response (e.g., HTTP message) may provide/specify/indicate the initial sequence number, the cryptographic secret, and/or other information. The device may access the information provided/indicated by the executable code (e.g., the sequence number, the cryptographic secret, and/or other information).

Responsive to a request (e.g., safe HTTP requests and/or other message requests), the client may generate/create/ produce validation cookie information (e.g., a fresh/morphed/additional cookie, a hash-based message authentication code (HMAC), and/or other information). The client may use the initial sequence number, the cryptographic secret, the cookie engine, and/or other information to generate the validation cookie information. The client may increase/increment the sequence number by a defined value (e.g., by 1 or other values) responsive to generating the validation cookie information. In some embodiments, the client may generate/produce fresh/novel validation cookie information and/or update the sequence number at each of a plurality of time instances (e.g., every 500 milliseconds, every 1 second, every time a certain event occurs, according to fixed and/or variable time intervals, and/or other time instances).

Upon receiving the request/transaction (e.g., request including a back-end server login cookie or authentication cookie), the device (e.g., a device intermediary between the client and the server) can validate/accept the request/transaction. The request/transaction may include/provide a validation cookie information generated by the client. If the device validates the request (e.g., HTTP request) using the validation cookie information, the device may remove/delete/strip the validation cookie information from the request. Responsive to validating the request, the device can forward/send/transmit/route the request (e.g., the request with the authentication cookie, and without the validation cookie information) to the server. If the device fails to validate the request, the device may remove/delete the authentication cookie generated by the server (e.g., the back-end authentication cookie). Responsive to invalidating the request, the device may forward the request (e.g., the request without the authentication cookie) to the server (e.g., back-end server), where the request is likely to fail (e.g., because the request lacks the authentication cookie).

In some embodiments, an attacker may use malware (e.g., operations/processes of a browser's developer console, such as Copy, Copy as cURL, or an HTTP proxy) to steal/acquire/obtain the validation cookie information (e.g., a cookie) generated by the client and/or the authentication cookie. The stolen validation cookie information may correspond to previous/stale/outdated validation cookie information (e.g., the client can generate/update the validation cookie information at each of a plurality of time instances). Therefore, the attacker may be unable to use the stolen validation cookie information with the device (e.g., an ADC) to initiate/establish a connection (e.g., TLS connection, SSL connection, and/or other types of connection) to access the server. In order for the attacker to successfully initiate a new connection using valid/correct validation cookie information, the malware/attacker would have to obtain/steal the cryptographic secret and/or the cookie engine (e.g., to produce/generate the correct validation cookie information).

The device (e.g., ADC and/or other devices) can use recently generated/updated and/or fresh validation cookie information to initiate a new connection (e.g., a TLS connection). To initiate a new connection, a request/transaction/method (e.g., HTTP request/transaction and/or other requests) may include/provide/specify the validation cookie information. If the request includes the validation cookie information, the client may either be running/using the previously injected executable code (e.g., including a cookie engine and/or a cryptographic secret), or an attacker may have stolen the validation cookie information to make the request. The device can differentiate/distinguish/discern between the client and the attacker by sending/transmitting a redirect (e.g., 307 temporary redirect) to the client. Responsive to receiving the redirect, the client may generate fresh/new validation cookie information with an updated sequence number. The device may validate the freshly generated cookie (e.g., confirm the updated sequence number is correct) following the redirect.

If the connection (e.g., TLS connection) corresponds to a new connection, the device may validate/confirm that the request is from the client (e.g., using fresh validation cookie information and/or the sequence number) once during the connection. Subsequent assertions of validation cookie information within the same connection session may be optional. In some embodiments, the device may perform/execute certain functions of the hash-based message authentication code (e.g., SHA256 HMAC) once per new connection (e.g., to achieve an acceptable or reduced CPU load).

Although the device can merely validate the request once during a connection or session, the device may keep track of updates/increases to the sequence number provided by the client. This is because the client may initiate a new connection to a same server eventually. Starting the new connection with the same server may rely on the device knowing the expected sequence number for the new connection.

In some embodiments, a client may perform one or more actions (e.g., reloading/refreshing a page (CTRL-R) and/or other actions) that reset/restore/reestablish the sequence number to an initial value. Resetting the sequence number to an initial value may cause the device (e.g., ADC) to perform a secret challenge and/or a new round-trip. In some embodiments, local storage (e.g., window.local Storage) may be used to store/maintain the latest sequence number in order to avoid the secret challenge. After a page refresh, for example, the client may retrieve/access/obtain/acquire the latest sequence number and/or secret from the local storage. An attacker may not be aware that it can access or steal the latest sequence number and/or secret from the local storage.

In some embodiments, mobile applications and/or services may modify/generate validation information (e.g., cookie morphing) to prevent the validation information from being stolen. For example, a mobile application and/or service may generate/regenerate/modify/morph the validation cookie information, without having to receive the executable code of the cookie engine (e.g., via a HTTP message and/or other messages). The mobile application and/or service may already include/have access to the executable code of the cookie engine (e.g., the cookie engine may be pre-installed). For example, a server (e.g., a back-end server) may send/transmit an authentication cookie (or other information) to the client (e.g., mobile application) responsive to authenticating a request/message from the client. The server may send/transmit the authentication cookie via a device (e.g., ADC and/or other devices). The device can send/transmit/provide a cookie originated by the device (or other validation information), an initial sequence number (e.g., random initial sequence number), a secret (e.g., a cryptographic secret), and/or other information to the client. The client may process the cookie originated from the device using one or more functionalities (e.g., a provided function, a software development kit (SDK), and/or other functionalities) and/or store/maintain the cookie originated from the device (e.g., store the cookie originated from the device using local storage). If the client performs/initiates a transaction/process (e.g., HTTP transaction and/or other transactions), the client may use at least one functionality (e.g., provided function) to perform a hash-based message authentication code (HMAC) of the cookie originated from the device, and/or a sequence number. The client may increment/increase/modify the sequence number responsive to performing the HMAC of the cookie and/or sequence number. The device can validate/authenticate/confirm the HMAC and/or may keep track of a window (e.g., a time window) of allowed incoming sequence numbers. The systems and methods discussed herein can be used to protect one or more HTTP methods, such as safe and/or unsafe HTTP methods.

In some embodiments, a web browser feature (e.g., service worker and/or other features) can intercept or detect an outgoing request/message (e.g., HTTP GET message). The web browser feature of the client may cause the client to generate validation cookie information with the updated sequence number, to include in the outgoing request/message.

Figure 3:
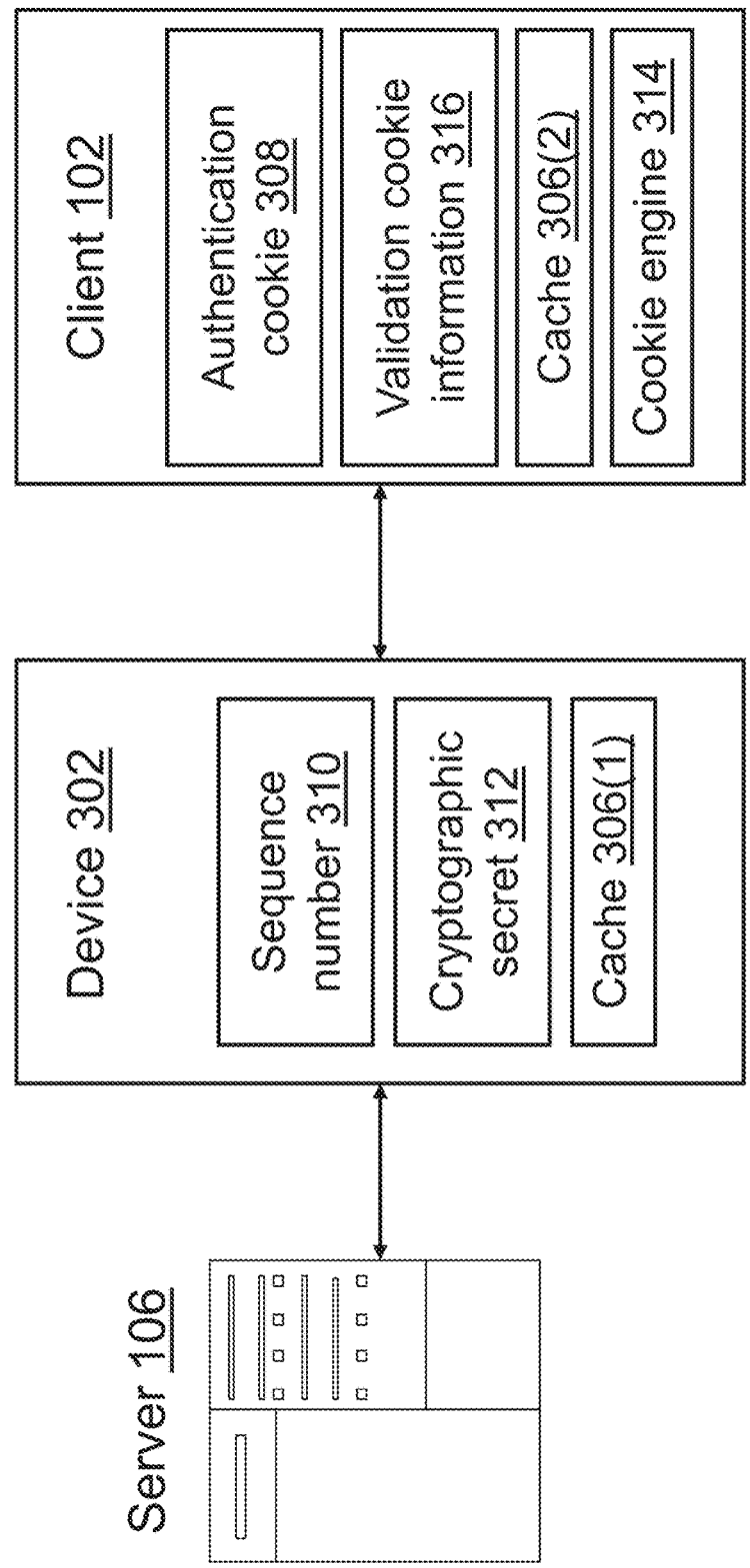
FIG. 3 is a block diagram of a system for morphing or regenerating validation information, in accordance with an illustrative embodiment.

Referring to FIG. 3, depicted is a block diagram of one example embodiment of a system 300 for morphing or regenerating the validation information, e.g., to prevent validation information from being stolen and mis-used. The system 300 may include one or more clients 102 of an entity, one or more devices 302, and/or one or more servers 106. The device 302 can include or maintain a sequence number 310, a cryptographic secret 312, and/or a cache 306. The client 102 can include or maintain an authentication cookie 308, validation cookie information 316, a cache 306, and/or a cookie engine 314.

Each of the above-mentioned elements or entities is implemented in hardware, or a combination of hardware and software, in one or more embodiments. Each component of the system 300 may be implemented using hardware or a combination of hardware or software detailed above in connection with FIG. 1C. For instance, each of these elements or entities can include any application, program, library, script, task, service, process or any type and form of executable instructions executing on hardware of a client device 102, a server 106 and/or a network device 200 in connection with FIGS. 1B-1C, for instance. The hardware includes circuitry such as one or more processors in one or more embodiments.

The system 300 may include one or more servers 106. The server 106 (e.g., a back-end server supporting HTTPS messages or transactions, and/or other servers 106) may be configured and/or designed to host one or more services (e.g., application resources, as a web application, SaaS application or remote-hosted network application) and/or to provision the one or more services to one or more clients 102 of a consumer or other entity (e.g., an organization or user), via one or more networks 104. For example, the client 102 may establish one or more sessions or connections (e.g., secured or otherwise, such as a SSL virtual private network connection) with the server(s) 106 to access a service, such as an application resource. In another example, the server(s) 106 may receive/obtain a request (e.g., a HTTP request) from the client 106 (e.g., via a device 302) to access/use one or more services (or establish the connections to access the one or more services). Responsive to receiving the request(s), the server(s) 106 may generate/set/create an authentication cookie 308 (or other authentication/validation information) for the client 102 to access the service (e.g., an application resource) using information provided by the client 102 (e.g., username, password, and/or other authentication/login information). The server(s) 106 can send/provide an authentication cookie 308 to the client 102 via the device 302. The server(s) 106 can be part of a cloud or datacenter for instance. The server(s) 106 may include any embodiment of volatile memory 122 or non-volatile memory 128 (discussed in FIG. 1C for example) which may store files, data and/or content of the service. The server(s) 106 may communicate with other various components of the system 300 in FIG. 3 via a communications interface 118 for instance. Hence, the server(s) 106 may be similar in some aspects to the computer 101 described with reference to FIG. 1C.

To provide a service, the server(s) 106 may execute, provide, provision, and/or host one or more network application(s). In some embodiments, a service may be referred to interchangeably with an application, application resource or network application. A network application can for instance include a remote-hosted application, a remote-hosted desktop, a web application or a software-as-a-service (SaaS) application. A remote-hosted desktop may be a virtual desktop hosted on the server 106 which is accessed by or remotely provisioned to the client 102. In some embodiments, the delivery of a remote-hosted desktop may be via a session and/or connection based on High-Definition User Experience (HDX) or Independent Computing Architecture (ICA) display remoting protocol, or Remote Desktop Protocol (RDP). A remote-hosted application may include/correspond to an application service that can be delivered via a HDX-based, ICA-based, RDP-based, etc., session and/or connection. In some embodiments, a remote-hosted application may be an application which is installed on/in the remote-hosted desktop environment and is therefore accessible within the remote-hosted desktop. A SaaS application can be a centrally-hosted application which is typically accessible on a subscription basis. In some embodiments, the SaaS applications may include web-based applications. In other embodiments, the SaaS applications may correspond to remote-hosted applications and, therefore, can be delivered in HDX/ICA/RDP-based sessions and/or connections. SaaS applications and/or web applications may include for instance salesforce.com, SAP, Microsoft Office 365, Dropbox or Gmail service, Amazon web services, and so on.

The system 300 may include one or more clients 102. The client 102 may include or correspond to devices of a consumer of the service. For example, if the consumer is an individual or user, the client 102 may comprise a smartphone, a laptop (e.g., at home), a tablet device, and a desktop computer (e.g., at work), that the user may use to access an application resource (e.g., Dropbox service) at various times and/or locations for instance. In an example where the consumer is an organization, such as an enterprise, the consumer can extend over a number of users (e.g., management persons, staff members, IT administrators, and so on) and their associated client(s) 102 or devices (e.g., corporate-issued device, personally-owned devices, and/or registered/approved devices (e.g., in a BYOD program)). Any number of the users may access a service (e.g., salesforce.com, SAP, Microsoft Office 365) from a service provider, via a corporate account for the service for instance.

The client 102 may be configured and/or designed to access application resource(s) over one or more networks. In some embodiments, the client 102 may interact with the server(s) 106 via a device 302 (e.g., a device 302 intermediary between the client 102 and the server(s) 106). For example, the client 102 may send a request and/or message (e.g., a request to access/use a service) to the server(s) 106 via the device 302. Responsive to sending the request, the client 102 may receive/obtain/acquire an authentication cookie 308 from the device 302 to access the server(s) 106. In another example, the client 102 may receive executable code (e.g., JavaScript or other code) and/or a link from the device 302 (e.g., via a HTTP message and/or other messages) responsive to sending the request. The executable code and/or link may provide a cookie engine 314, an initial sequence number 310 (for example, a randomized or default initial sequence number 310), a cryptographic secret 312 (for example, a randomized initial sequence number 310), and/or other information. Another message/response (e.g., HTTP message) may provide/indicate the sequence number 310, the cryptographic secret 312, and/or other information. The client 102 may use the cryptographic secret 312 and/or the cookie engine to generate validation cookie information 316 (e.g., a morphed cookie, an additional cookie, an HMAC or ADC originated cookie, and/or other information) and/or an updated sequence number 310. The client 102 may send/transmit the authentication cookie 308, the validation cookie information 316, and/or the updated sequence number 310 to the server(s) 106 via the device 302 to access the server(s) 106 and/or the service(s) hosted by the server(s) 106.

In some embodiments, the client 102 can include or have, among other elements, a cache 306, an authentication cookie 308, validation cookie information 316, and/or a cookie engine 314. The cache 306 included in the client 102 and/or the device 302 may be configured and/or designed to store or maintain data and/or content, for example the authentication cookie 308, the validation cookie information 316, the sequence number 310, the cryptographic secret 312, and/or other information. In some embodiments, the cache 306 may include or correspond to a memory 264 of the device 302, or may include or correspond to a physical memory having a faster access time than memory 264. The cache 306 may duplicate data (e.g., original data) stored elsewhere (e.g., a device 302), or maintain data previously computed, generated or transmitted to reduce the access time of the data. The cache 306 can be located within, outside, or adjacent to the device 302. In some embodiments, the client 102 may store/maintain a sequence number 310 (e.g., an updated sequence number 310) in the cache 306. If the client 102 refreshes/reloads a page, the client 102 may access/obtain/acquire the sequence number 310 (e.g., latest, current or most up-to-date sequence number) from the cache 306 (or other local storage). In some embodiments, the cookie engine 314 of the client 102 may interface/interact with the cache 306(2) of the client 102 and/or the cache 306(1) of the device 302 to generate the validation cookie information 316 and/or update the sequence number 310. For example, if the cryptographic secret 312 is stored in the cache 306(1) of the device 302, the cookie engine 314 may interact/interface with the cache 306(1) to access the cryptographic secret 312, e.g., to generate validation cookie information.

The authentication cookie 308 included in the client 102 and/or the device 302 may be configured and/or designed to access/use a server 106 and/or a service hosted on the server 106. In some embodiments, the server 106 may generate/create/produce/set the authentication cookie 308 for the client 102 to access the server 106. The server 106 may provide/generate a different authentication cookie 308 (e.g., to the client 102 via the device 302) for each connection initiated by a client 102. The device 302 may provide/indicate/convey the authentication cookie 308 to the client 102 via a message (e.g., HTTP message). In some embodiments, the authentication cookie 308 may be validated/confirmed/authenticated by the device 302 according to the validation cookie information 316 and/or the updated sequence number 310. For example, if the updated sequence number 310 of the client 102 matches/corresponds to the sequence number 310 expected by the device 302, the device 302 may validate/confirm the authentication cookie 308. If the authentication cookie 308 is validated by the device 302, the device 302 may send/transmit/forward the authentication cookie 308 to the server 106. In some embodiments, the authentication cookie 308 can provide/include information of the user/client 102 (e.g., a username, password, and/or other information or authentication credentials) and/or the server 106. The client 102 may use the authentication cookie 308 to access the server 106 and/or a service hosted on the server 106.

The validation cookie information 316 included in the client 102 may be configured and/or designed to validate the authentication cookie 308. The validation cookie information 316 may comprise a morphed/modified cookie, a cookie generated by the client 102, a cookie generated by the device 302, a HMAC originated/determined using an ADC cookie, and/or other information to validate/authenticate a request/message (e.g., HTTP GET message). In some embodiments, the validation cookie information 316 may be generated/created by the client 102 (e.g., with an updated sequence number 310) using the cookie engine 314, the cryptographic secret 312, the sequence number 310, and/or other information indicated by an injected/provided executable code. In some embodiments, the validation cookie information 316 may be generated (e.g., by the client 102) using a cookie (or other information) provided/indicated/specified by the device 302. For example, the client 102 may generate/create/produce the validation cookie information 316 by modifying/morphing a cookie generated/provided by the device 302 into another cookie. The client 102 may modify/morph the cookie provided by the device 302 into another cookie (or other information) that fits the expectations of the device 302 at a certain time or within a certain time window for instance. The client 102 may use the cryptographic secret 312, the cookie engine 314, and/or other information to modify/morph the cookie generated by the device 302.

In some embodiments, generating the validation cookie information 316 may cause the client 102 to increment/increase the sequence number 310 by a defined value (e.g., by 1 or other values). For example, if the client 102 generates or updates validation cookie information 316, the client 102 can increment the sequence number 310 from an existing value of 20 to a value of 21. In some embodiments, the validation cookie information 316 may be generated/updated at each of a plurality of time instances. For example, the client 102 may use the cryptographic secret 312, the cookie engine 314, and/or other information to generate the validation cookie information 316 (e.g., with a respective updated sequence number 310) on each of a variable or fixed time interval (e.g., every 500 milliseconds or other time intervals). In another example, the client 102 may generate/produce the validation cookie information 316 responsive to the occurrence of certain events, each event corresponding to a particular time instance and a respective sequence number.

The cookie engine 314 included in the client 102 may be configured and/or designed to generate the validation cookie information 316, for example by using the cryptographic secret 312 and/or other information. The cookie engine 314 may be configured and/or designed to access, control and/or manage objects, data or content being cached by the device 302. The cookie engine 314 can be located within, outside, or adjacent to the device 302. The cookie engine 314 may comprise one or more programs or services that are executable individually or in some combination on hardware of the cookie engine 314. The cookie engine 314 may use, interface and/or interact with one or more of the cryptographic secret 312, cache 306, and/or other elements, e.g., to generate the validation cookie information 316. In some embodiments, the cookie engine 314 may comprise an injected JavaScript, a provided function in a mobile-native application, and/or other programs/services executable on hardware.

In some embodiments, the device 302 may inject/provide an executable code of the cookie engine 314 into an HTTP message (or other messages). The cookie engine 314 may be provided to the client 102 as executable code (e.g., JavaScript code) and/or a link from the device 302 (e.g., via a HTTP message and/or other messages). The cookie engine 314 may be used to generate/produce/create/modify the validation cookie information 316 with an updated sequence number 310 and/or other information. In some embodiments, the cookie engine 314 may be pre-installed on the client 102. If the cookie engine 314 is pre-installed (e.g., as part of a mobile application), the client 102 may use the cookie engine 314 to obtain a HMAC of the validation cookie and/or the sequence number 310 (e.g., generating the validation cookie information 316). In some embodiments, the cookie engine 314 may generate/produce the validation cookie information 316 at each of a plurality of time instances (e.g., at a fixed time interval, at a variable time interval, triggered by an event, and/or other time instances).

The system 300 may include one or more devices 302 (sometimes referred to as appliance(s) 200, gateway(s) 200, node(s), and/or application delivery controllers). A device 302 may be configured and/or designed to serve as an intermediary between different elements of a computer and/or network environment, such as between client(s) 102, server(s) 106, network(s) 104, and/or other devices 302 (e.g., as discussed above in connection with FIG. 2). In some embodiments, the device 302 may receive a request/message (e.g., HTTP message and/or other messages) from a client 102 and/or user to access an application resource or service from the server 106. Responsive to receiving the request/message, the device 302 may forward the request/message to the server 106, causing the server 106 to generate an authentication cookie 308 for the client 102. The device 302 may send/transmit/route the authentication cookie 308 to the client 102 while maintaining a sequence number 310 and/or a cryptographic secret 312. In some embodiments, the device 302 may provide the client 102 with access to the sequence number 310, the cryptographic secret 312, and/or other information.

In some embodiments, the device 302 may provide/inject an executable code (e.g., JavaScript code) and/or a link to the client 102 (e.g., via a HTTP message and/or other messages). The executable code and/or link may provide a cookie engine 314, an initial sequence number 310, a cryptographic secret 312, and/or other information. If the client 102 generates the validation cookie information 316 (e.g., using the information provided by the executable code), the device 302 may receive/obtain the authentication cookie 308, the validation cookie information 316 with the updated sequence number 310, and/or other information from the client 102 (e.g., via a HTTP message and/or other messages). The device 302 may determine whether to validate the authentication cookie 308 according to the validation cookie information 316 and/or the updated sequence number 310, e.g., whether these are as expected or match those of the device 302.

The device 302 may be located at various points or in various communication paths, for example between two networks 104, within a computing and/or network environment 100. In other embodiments, the device 302 may be located on a network 104. The devices 302 may communicate with one another and/or work in conjunction to, for example, accelerate, protect and/or secure network traffic between clients 102 and servers 106 and/or provide load balancing of servers 106 to process requests from clients 102. In some embodiments, the devices 302 may act as a proxy or access server to provide access to the one or more servers 106, provide security and/or act as a firewall between the client 102 and the server 106, and/or provide a secure VPN connection from the client 102 to the server 106, such as a SSL VPN connection and/or provide encryption and decryption operations.

In some embodiments, the device 302 can include, among other elements, a cache 306, a cryptographic secret 312, and/or a sequence number 310. The cryptographic secret 312 included in the device 302 may be configured and/or designed to generate validation cookie information 316. For example, the client 102 may use the cryptographic secret 312 and/or the cookie engine 314 to generate the validation cookie information 316. In some embodiments, the client 102 may use the cryptographic secret 312 to modify/morph a cookie generated by the device 302 into the validation cookie information 316 (e.g., a validation cookie). The cryptographic secret 312 may be injected/provided to the client 102 (e.g., by the device 302) via an executable code, a link, and/or other methods. For example, an executable code may provide an initial/default cryptographic secret 312 that can be used by a cryptographic process to generate/produce the validation cookie information 316. The cryptographic secret 312 may be known/accessible to the client 102 and/or the device 302. In some embodiments, the cryptographic secret 312 may correspond to a cryptographic key, a password, a passphrase, and/or other information. The value of the cryptographic secret 312 may correspond to a randomized/arbitrary/initialized value.

The sequence number 310 included in the device 302 may be configured and/or designed to validate/confirm the authentication cookie 308. For example, the client 102 may generate the validation cookie information 316 and/or the sequence number 310 to validate/confirm/authenticate the authentication cookie 308. If the client 102 generates the sequence number 310, the client 102 may send/transmit the sequence number 310 (e.g., with the validation cookie information 316) to the device 302. Responsive to generating the validation cookie information 316, the client 102 may increment/increase/change/update the sequence number 310 by a defined value. For example, if the client 102 generates fresh/new validation cookie information 316, the client 102 may correspondingly change the sequence number 310 from a value of 30 to a value of 32. In some embodiments, the sequence number 310 may be stored/maintained in a local storage (e.g., cache 306, window.localStorage, and/or other storage devices) of the client 102. Therefore, the client 102 (or device 302) may access the sequence number 310 from the local storage (e.g., responsive to a page refresh). In some embodiments, the updated sequence number 310 may comprise a sequence number 310 that has been modified by a defined value (e.g., responsive to generating the validation cookie information 316). An initial value of the sequence number 310 may be provided/injected to the client 102 (e.g., by the device 302) via an executable code, a link, and/or other methods. The value of the initial value of the sequence number 310 may correspond to a randomized/arbitrary value. In some embodiments, the device 302 may validate a HTTP-based request/message and/or an authentication cookie 308 by comparing the value of the sequence number 310 provided by the client 102 with an expected value of the device 302. For example, the device 302 may validate an authentication cookie 308 if the value of the sequence number 310 provided by the client 102 corresponds to the value expected by the device 302.

Figure 4:
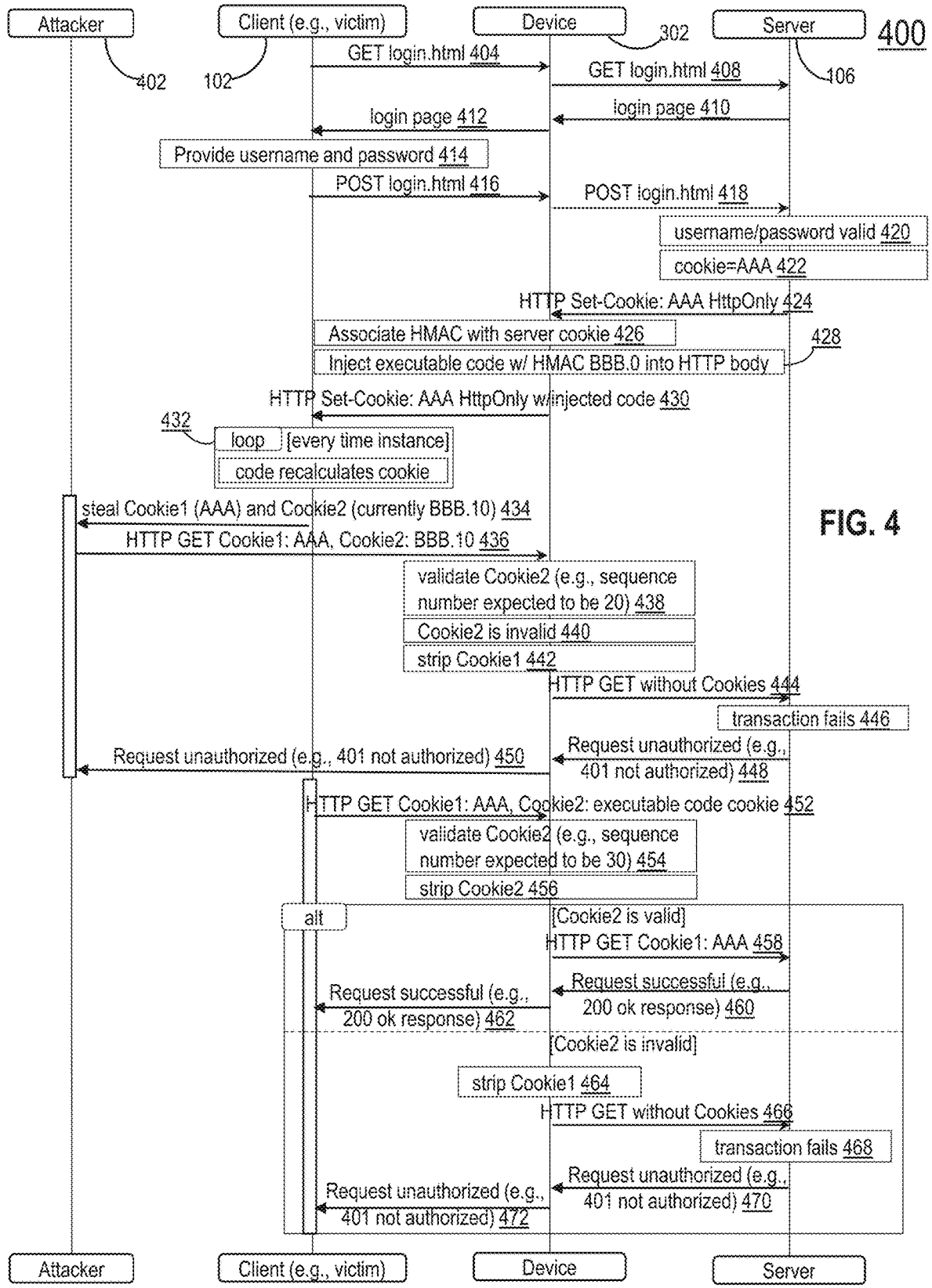
FIG. 4 is a communication diagram of a system for morphing or regenerating validation information, in accordance with an illustrative embodiment.

Referring now to FIG. 4, depicted is a communication diagram of an embodiment of a process 400 for preventing validation information from being stolen by morphing or regenerating the validation information. Under process 400, the client 102 may send/transmit a message/request (e.g., HTTP GET, GET login.html, and/or other requests) to the server 106 via the device 302 (404). The request/message may comprise a request to access a service/resource/application hosted on the server 106 and/or a request for an authentication cookie 308 to access the service. Responsive to receiving/obtaining the request from the client 102, the device 302 may forward/send/route the request to the server 106 (408). The server 106 may receive the request (e.g., a request to access a service) from the device 302 (408) and/or send another message/request to the client 102 via the device 302 (410). The another message/request may comprise a request for authentication credentials (e.g., a username, a password, a personal identifier, an authentication token, and/or other credentials) to access the service. Responsive to receiving the message/request from the server 106, the device 302 may send/forward/transmit/route the message from the server 106 to the client 102 (412).

Responsive to receiving/obtaining the request from the device 302, the client 102 may provide/indicate/supply the authentication credentials to access the service (414). For example, the client 102 may provide a username and/or a password, which can be transmitted/routed to the server 106 (e.g., via the device 302). The client 102 may use a method/request/message (e.g., HTTP POST and/or other methods) to send/transmit/supply the authentication credentials (or other data) to the server 106 via the device 302 (416). For example, the client 102 can use a HTTP POST message to send/provide the username and/or password to the server 106 via the device 302. The HTTP POST message may comprise a request (e.g., from the client 102 to the server 106) to accept/approve the data (e.g., the username and/or password) included in the message. The device 302 may receive/acquire the message with the authentication credentials (e.g., HTTP POST) from the client 102 (416) and/or send/forward the message to the server 106 (418).

Responsive to receiving the message/request (e.g., HTTP POST message or other messages), the server 106 may confirm/authenticate/validate the received authentication credentials (420). For example, the server 106 may confirm whether the client 102 provided a valid username and/or password to access the server 106 and/or a service hosted by the server 106. If the server 106 determines the provided authentication credentials (or other information) are valid, the server 106 may generate/create/produce an authentication cookie 308 for the client 102 (422). The server 106 may provide/indicate the authentication cookie 308 to the client 102 (e.g., via the device 302), wherein the client 102 can use the authentication cookie 308 (e.g., cookie=AAA) to access the server 106 and/or the service. Responsive to validating the information included in the message/request (e.g., HTTP POST), the server 106 may send/route/forward the generated authentication cookie 308 to the client 102 via the device 302 (424). For example, the server 106 may send/forward the authentication cookie 308 (or other information) to the client 102 via the device 302 by using a message/response (e.g., HTTP Set-Cookie response header). Once the device 302 receives the authentication cookie 308 from the server 106 (e.g., via the HTTP Set-Cookie response header), the device 302 may associate/combine a HMAC with the authentication cookie 308 (426).

The device 302 can inject/include an executable code (e.g., executable code of the cookie engine 314), the HMAC, a sequence number 310, a cryptographic secret 312, and/or other information into a message/response (428). For example, the device 302 may inject/combine the executable code (e.g., a JavaScript), the HMAC, the sequence number 310 and/or the cryptographic secret 312 into the body of a HTTP message. Responsive to injecting/combining the message (e.g., HTTP message) with the information (e.g., executable code, sequence number 310, cryptographic secret 312 and/or other information), the device 302 may send/transmit the message to the client 102 (430). The received message may provide the client 102 with access to an executable code of the cookie engine 314, the authentication cookie 308, an initial sequence number 310, the cryptographic secret 312, and/or other information. The client 102 may use the information accessible through the message (e.g., HTTP message) to generate validation cookie information 316. For example, the client 102 may use the cookie engine 314, the cryptographic secret 312 (e.g., provided in the message and/or accessed in the device 302), and/or the initial sequence number 310 to generate an initial validation cookie information 316 (or subsequent validation cookie information 316).

If the client 102 has access to the executable code of the cookie engine 314 and/or the cryptographic secret 312, the client 102 may use the cookie engine 314 and/or the cryptographic secret 312 to generate validation cookie information 316 at each of a plurality of time instances (432). Responsive to generating the validation cookie information 316, the client 102 may increase/increment/change the sequence number 310. For example, the client 102 may use the cookie engine 314, the cryptographic secret 312 and/or other information to generate the validation cookie information 316 every 500 milliseconds (or other time intervals) and/or responsive to the occurrence of one or more events. The client 102 may increase/change/update the value of the sequence number 310 (e.g., from 10 to 11) when generating the validation cookie information 316.

In some embodiments, an attacker 402 (e.g., malicious device or program) may steal/acquire/access the authentication cookie 308, the validation cookie information 316, the updated sequence number 310, and/or other information from the client 102 (434). For example, the attacker 402 may steal the authentication cookie 308 and the validation cookie information 316 at a time instance X from the client 102. However, the attacker 402 may fail to steal the executable code of the cookie engine 314 and/or the cryptographic secret 312, at least one of which (or both) may be required to generate valid/current validation cookie information 316. If the attacker 402 obtains the validation cookie information 316 and/or the authentication cookie 308, the attacker 402 may attempt to access the server 106 and/or a service provided by the server 106 by using the stolen authentication cookie 308 and/or validation cookie information 316. In some embodiments, the attacker 402 may send/transmit a message/request (e.g., HTTP GET and/or other messages) to the server 106 via the device 302 in an attempt to access the server 106 and/or a service (436). In the attempt to access the server 106 and/or service, the attacker 402 may send/transmit/provide the stolen information (e.g., authentication cookie 308, validation cookie information 316, updated sequence number 310, and/or other information) towards the server, to/via the device 302 (436). The message/request may include/provide the stolen information to the device 302. The device 302 may receive the message and/or stolen information from the attacker 402.

Responsive to receiving/obtaining the message and/or the stolen information, the device 302 may attempt to validate/authenticate/confirm the stolen information, such as the authentication cookie 308 (e.g., Cookie1: AAA), the validation cookie information 316 (e.g., Cookie2: BBB), and/or the updated sequence number 310 (438). However, because the attacker 402 stole the validation cookie information 316 and/or the sequence number 310 at a previous time instance, the validation cookie information 316 provided by the attacker 402 may be invalid/stale. For example, the attacker 402 may obtain the validation cookie information 316, the authentication cookie 308, and/or the sequence number 310 (e.g., from the client 102) at a time instance X. At a time instance X+10 (or other time instances), the attacker 402 may attempt to access the server 106 via the device 302 by using the stolen information (e.g., providing the stolen information to the device 302). However, between time instance X and time instance X+10, the client 102 may generate new/fresh/updated validation cookie information 316 (e.g., using the cookie engine 314 and/or the cryptographic secret 312) and/or update the sequence number 310. For example, the sequence number 310 at time X may correspond to a value of 10 (or other numbers), while the sequence number 310 at time X+10 may correspond to a value of 20 (or other numbers). The device 302 can be aware (e.g., via synchronization with the cookie engine) that the validation cookie information 316 and/or the sequence number 310 have been updated by the client 102 (e.g., at a time instance X+10, the device 302 may expect a sequence number 310 with a value of 20). Therefore, if the device 302 attempts to validate the stolen information (e.g., validation cookie information 316 and/or sequence number 310 corresponding to time X), the device 302 may determine that the stolen information is invalid (440).

Responsive to determining that the stolen information is invalid, the device 302 may strip/eliminate/remove the authentication cookie 308 (e.g., Cookie1) and/or other information from the request/message (e.g., HTTP GET message) (442). The device 302 may send/forward the request/message to the server 106 without the authentication cookie 308 (444). If the server 106 receives the request/message without the authentication cookie 308, the request to access the server 106 and/or service may fail (446). Therefore, the attacker 402 may fail to access the server 106 and/or the service. The server 106 may send/transmit a response/message to the attacker 402 via the device 302, wherein the response/message indicates that the request to access the server 106 has failed and/or is unauthorized (448-450).

In some embodiments, the client 102 may send/provide a message/request (e.g., HTTP GET or other messages) to the server 106 via the device 302 (452). The message/request may comprise a request to access/use the server 106 and/or a service provided/hosted by the server 106. The message/request may include/provide the authentication cookie 308 (e.g., Cookie1: AAA), the validation cookie information 316 (e.g., Cookie2: executable code cookie), the sequence number 310, and/or other information. The validation cookie information 316 may correspond to new/updated/fresh validation cookie information 316 generated by the client 102 (e.g., using the cookie engine 314 and/or the cryptographic secret 312). If the device 302 receives the information (e.g., message/request, validation cookie information 316, sequence number 310, and/or authentication cookie 308), the device 302 may determine whether the received information is valid (454). For example, the device 302 may compare an expected value of the sequence number 310 (e.g., 30 or other numbers) with the received sequence number 310 (e.g., the same value as the expected value). If the received sequence number 310 corresponds to the expected value, the device 302 may determine that the received information (e.g., request/message, validation cookie information 316, sequence number 310, and/or authentication cookie 308) is valid. Responsive to validating the received information and/or request, the device 302 may strip/eliminate/remove/discard the validation cookie information 316 from the received message (456). The device 302 may forward/send the message/request (e.g., HTTP GET request) to the server 106 without the validation cookie information 316 (e.g., with the authentication cookie 308) (458). If the server 106 determines the authentication cookie 308 is valid, the server 106 may send/transmit a message/response (e.g., 200 ok response) to the client 102 via the device 302 (460-462). The message/response may indicate that the authentication cookie 308 is valid, and therefore, the client 102 may access/use the server 106 and/or the service hosted by the server 106.

In some embodiments, the device 302 may strip/remove the authentication cookie 308 and/or the validation cookie information 316 from the message/request responsive to validating the received request/message, validation cookie information 316, sequence number 310, and/or authentication cookie 308 (464). If the device removes the authentication cookie 308 and/or the validation cookie information 316, the device 302 may send/forward the request/message (e.g., from the client 102) to the server 106 without the authentication cookie 308 and/or the validation cookie information 316 (466). Therefore, the device 302 may withhold one or more cookies (or other information) from the server 106. If the server 106 receives the message/request (e.g., HTTP GET message or other messages) without the authentication cookie 308 (or other information), the server 106 may fail to validate the message/request/transaction (468). Therefore, the client 102 may fail to access the server 106 and/or the service. Responsive to determining the message/request/transaction is invalid/unauthorized, the server 106 may send/transmit a message (e.g., 401 not authorized message) to the client 102 via the device 302 (470-472). The message may indicate to the client 102 that the request is invalid, and therefore, that the client 102 is unable to access the server 106.

Figure 5:
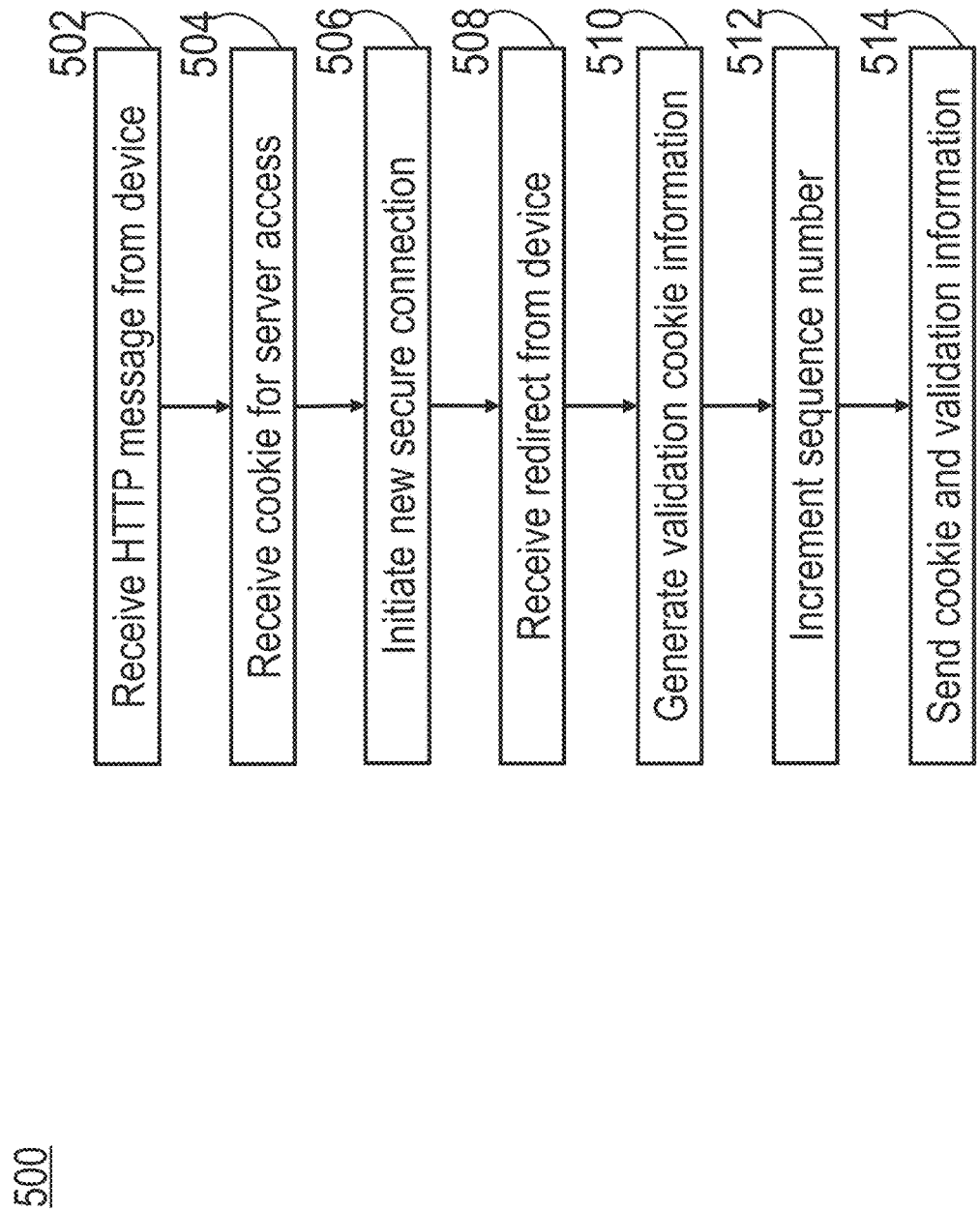
FIG. 5 is a flow diagram of an example method for morphing or regenerating validation information, in accordance with an illustrative embodiment.

Referring to FIG. 5, depicted is a flow diagram of one embodiment of a method for preventing validation information from being stolen by morphing or regenerating the validation information. The functionalities of the method may be implemented using, or performed by, the components detailed herein in connection with FIGS. 1-4. In brief overview, a client 102 may receive an HTTP message from the device 302 (502). The client 102 may receive a cookie for server 106 access (504). The client 102 may initiate a new secure connection (506). The client 102 may receive a redirect from the device 302 (508). The client 102 may generate validation cookie information 316 (510). The client 102 may increment a sequence number 310 (512). The client 102 may send the cookie and the validation cookie information 316 (514).

Referring now to operation (502), and in some embodiments, a client 102 may receive/obtain an HTTP message from a device 302. In some embodiments, the device 302 (e.g., an ADC and/or other devices) may send/transmit/provide/forward an HTTP message (e.g., a prior HTTP message, another HTTP message, and/or other messages) to the client 102. The device 302 may inject/include/combine an executable code (e.g., JavaScript, HTML code, and/or other executable codes) of a cookie engine 314 into the HTTP message. Therefore, the device 302 may provide the executable code of the cookie engine 314 to the client 102 via the HTTP message (e.g., HTTP Set-Cookie and/or other messages). The client 103 may access/use/execute the executable code of the cookie engine 314 received via the HTTP message from the device 302. In some embodiments, the device 302 may provide the executable code of the cookie engine 314 (e.g., via the HTTP message) responsive to receiving/obtaining a HTTP message (or other messages) from the server 106. The HTTP message from the server 106 may provide/include an authentication cookie 308 that provides server access to the client 102 (or other information). In some embodiments, the device 302 may combine/use/fuse the content of the HTTP message from the server 106

(e.g., providing the authentication cookie 308) with the executable code of the cookie engine 314. Therefore, the client 102 may receive/obtain the executable code of the cookie engine 314 and/or the authentication cookie 308 via a HTTP message (or other messages).

Referring now to operation (504), and in some embodiments, the client 102 may receive/obtain/acquire a cookie for server 106 access. In some embodiments, the device 302 may send/transmit an authentication cookie 308 (e.g., from the server 106) to the client 102. The client 102 may receive the authentication cookie 308 (or other information) from the server 106 via the device 302. The server 106 may send/transmit the authentication cookie 308 (or other information) via the device 302 using a message, such as an HTTP message (e.g., HTTP Set-Cookie) and/or other messages. The server 106 may generate/provide/send the authentication cookie 308 responsive to receiving a message/request (e.g., HTTP GET and/or other messages) from the client 102 via the device 302. The message/request may comprise a request to access/use the server 106 and/or a service/application hosted by the server 102. The authentication cookie 308 may provide access to the server 106 and/or at least one service hosted by the server 106. The server 106 may provide/generate the authentication cookie 308 responsive to validating/authenticating/confirming one or more credentials (e.g., username, password, personal identification number, and/or other credentials) of the client 102. The device 302 can maintain/store a sequence number 310, a cryptographic secret 312, and/or other information (e.g., store in local storage, such as cache 306). The client 102 can access/use the sequence number 310, the cryptographic secret 312 and/or other information stored in the device 302. In some embodiments, the device 302 may be intermediary between the client 102 and the server 106.

Referring now to operations (506) and (508), and in some embodiments, the client 102 may initiate/launch a new secure connection. The new secure connection may comprise a TLS connection, a SSL connection, and/or other connections. Responsive to the initiation of the new secure connection, the device 302 may send/transmit a redirect to the client 102. The client 102 may receive/obtain the redirect from the device 302 (e.g., responsive to initiating the new secure connection) (508). Upon receiving the redirect, the client 102 may generate/create/update the validation cookie information 316 with the updated sequence number 310. Therefore, the device 302 may cause (e.g., via the redirect) the client 102 to generate/update/refresh/modify the validation cookie information 316 with the updated sequence number. For example, the device 302 may determine that a requested/triggered TLS connection is a new secure connection. Responsive to the determination, the device 302 may send the redirect to the client 102 to cause the client 102 to generate validation cookie information 316. In some embodiments, the device 302 may validate/authenticate/confirm the validation cookie information 316 once for each secure connection or session. For example, responsive to the initiation of a new secure connection, the device 302 may validate/confirm the validation cookie information 316 generated by the client 102. If the device 302 validates the validation cookie information 316, the device 302 may use the same validation cookie information for the entirety of the session initiated by the new secure connection.

Referring now to operation (510), and in some embodiments, the client 102 may generate/create/produce validation cookie information 316. The client 102 may use the cryptographic secret 312 and/or the cookie engine 314 (e.g., an injected JavaScipt, and/or a provided/installed function in a mobile application) to generate the validation cookie information (e.g., a morphed/modified cookie, a fresh/new cookie, a HMAC of a cookie generated by the device 302, and/or other information) with an updated sequence number. For example, the client 102 may receive/obtain the executable code of the cookie engine 314 (e.g., via an HTTP message and/or other messages) and/or an initial value of a sequence number 310 from the device 302 (e.g., responsive to initiating a request to access the server 106). Once the client 102 receives the cookie engine 314 and/or the sequence number 310, the client 102 can generate the validation cookie information 316 by accessing/using the cryptographic secret 312 (e.g., maintained in the device 302) and/or using the cookie engine 314 and the sequence number 310. In some embodiments, the client 102 may generate/create/produce the validation cookie information 316 by modifying/morphing/changing/adjusting/updating a cookie generated by the device 302. The client 102 can modify the cookie generated by the device 302 by using the cryptographic secret 312, the cookie engine 314, and/or other information. The client 102 can modify the cookie generated by the device 302 into the validation cookie information 316, which can comprise a cookie. In some embodiments, the client 102 may generate the validation cookie information 316 by generating new/fresh validation cookie information 316, which comprises a validation cookie. The client 102 may generate the new/fresh validation cookie information 316 by using the cryptographic secret 312, the cookie engine 314, and/or other information.

In some embodiments, the client 102 may generate a respective validation cookie information 316 with a respective updated sequence number 310 (e.g., using the cryptographic secret 312 and/or the cookie engine 314) at each of a plurality of time instances. The plurality of time instances can include fixed time intervals, variable time intervals, the occurrence of certain events, and/or other time instances. The device 302, the server 106, and/or the client 102 may determine/define the plurality of time instances. In some embodiments, the cookie engine 314 can be pre-installed on the client 102. For example, the cookie engine 314 may be pre-installed in a mobile application and/or service. If the cookie engine 314 is pre-installed on the client 102, the client 102 may generate/produce the validation cookie information 316 by receiving a validation cookie, a sequence number 310, and/or other information from the device 302 (e.g., the ADC). For instance, the sequence number may be communicated in an unencrypted/unencoded portion of a HTTP message. If the client 102 receives/obtain the information from the device 302, the client 102 can in some embodiments generate the validation cookie information 316 by obtaining a HMAC of the received validation cookie and/or the sequence number 310.

Referring now to operation (512), and in some embodiments, the client 102 may increment/increase/change/adjust a sequence number 310. In some embodiments, generating the validation cookie information 316 with the updated sequence number 310 may comprise incrementing/increasing/modifying/changing/updating the sequence number 310 by a defined value (e.g., by 1 and/or other values). The client 102 may increment the sequence number 310 by the defined value (e.g., responsive to generating the validation information 316). The device 302 may use the incremented sequence number 310 to validate/authenticate/confirm the validation cookie information 316 and/or a request (e.g., from the client 102) to access the server 106. In some embodiments, the device 302 may have access to the updated sequence number 310 and/or the defined value. In some embodiments, the client 102 can maintain/store the updated sequence number 310 in a local storage (e.g., window.localStorage, cache 306, and/or other local storages). After a page refresh (or other events), the client 102 may access/use/obtain the updated sequence number 310 from the local storage and/or other storage devices. Storing the updated sequence number 310 in the local storage may avoid a new round-trip (e.g., reducing resource usage) for the device 302. In some embodiments, the client 102 may obtain the updated sequence number by incrementing/increasing/changing/modifying the sequence number 310 (e.g., by the defined value and/or other values). The device 302 may be caused (e.g., by the client 102) to validate a HMAC of the validation cookie and/or the sequence number 310.

Referring now to operation (514), and in some embodiments, the client 102 may send/transmit/forward/provide the cookie and the validation cookie information 316. The client 102 may send/transmit the authentication cookie 308, the validation cookie information 316 with the updated sequence number 310, and/or other information to the device 302. The client 102 may send/provide the information (e.g., authentication cookie 308, validation cookie information 316, and/or other information) via a HTTP message (e.g., HTTP GET message and/or other messages) to validate the authentication cookie 308. The device 302 may receive/obtain the authentication cookie 308, the validation cookie information 316 with the updated sequence number 310, and/or other information via the HTTP message (or other messages). Responsive to receiving the information via the HTTP message, the device 302 may determine whether to validate the authentication cookie 308. The device may determine whether to validate the authentication cookie 306 according to (e.g., a content or value of) the validation cookie information 316 and/or the updated sequence number 310.

For example, responsive to receiving the authentication cookie 308, validation cookie information 316, and/or the updated sequence number 310, the device 310 may determine whether the authentication cookie 308 is valid by using the received information. For instance, the device 310 may compare/examine/analyze the content of the received validation cookie information 316. If the received validation cookie information 316 matches the expectations of the device 302, the device 302 may confirm/validate/authenticate the authentication cookie 308 (e.g., the client 102 may access the server 106). In another example, if the received updated sequence number 310 is different from the value expected by the device 302, the device 302 may determine the authentication cookie 308 is invalid. In some embodiments, one or more entities and/or actions may cause the device 302 to remove/eliminate/delete the validation cookie information 316 from the HTTP message (e.g., the HTTP message that provides the authentication cookie 308, the validation cookie information 316, and/or other information). For example, if the device 302 validates the authentication cookie 308, the device 302 can be caused (e.g., by the validation, by the server 106, by the client 102, and/or other actions/entities) to remove the validation cookie information from the HTTP message. The device 302 may communicate/send/transmit the HTTP message with the authentication cookie 308 to the server 106, responsive to the successful validation of the authentication cookie 308.

In some embodiments, the HTTP message may comprise a HTTP GET message, a HTTP INFO message, a HTTP HEAD message, and/or other messages. In some embodiments, a browser feature (e.g., service worker and/or other features that can intercept a message) of the client 102 may detect/determine that the HTTP message is to be sent. Responsive to the detection, the client 102 can generate/produce/modify the validation cookie information 316 with the updated sequence number 310 and/or other information.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

We claim:
1. A method comprising:
receiving, by a client via a device, an authentication cookie for access to a server, the device maintaining a sequence number and a cryptographic secret;

receiving, by the client from the device, a cookie engine, the cookie engine being executable code that when executed generates validation cookie information;

generating, by the client using the cryptographic secret and the cookie engine, validation cookie information with an updated sequence number increased by the client by a predetermined defined value responsive to generating the validation cookie information; and sending, by the client to the device via a hypertext transfer protocol (HTTP) message, the authentication cookie, and the validation cookie information with the updated sequence number to validate the authentication cookie.

2. The method of claim 1, wherein generating the validation cookie information comprises:

modifying, by the client using the cryptographic secret and the cookie engine, a cookie generated by the device, into the validation cookie information which comprises a validation cookie.

3. The method of claim 1, wherein generating the validation cookie information comprises:

generating, by the client using the cryptographic secret and the cookie engine, the validation cookie information which comprises a validation cookie.

4. The method of claim 1, wherein the HTTP message comprises a HTTP GET message, a HTTP INFO message, or a HTTP HEAD message.

5. The method of claim 1, wherein generating the validation cookie information with the updated sequence number comprises:

incrementing, by the client, the sequence number by a defined value.

6. The method of claim 1, comprising:

generating, by the client using the cryptographic secret and the cookie engine, at each of a plurality of time instances, a respective validation cookie information with a respective updated sequence number.

7. The method of claim 1, comprising:

detecting, by a browser feature of the client, that the HTTP message is to be sent; and generating, by the client responsive to the detection, the validation cookie information with the updated sequence number.

8. The method of claim 1, comprising:

initiating, by the client, a new secure connection; and receiving, by the client responsive to the new secure connection, a redirect from the device to the client; and generating, by the client upon the redirect, the validation cookie information with the updated sequence number.

9. The method of claim 1, comprising:

storing, by the client, the updated sequence number in a local storage; and accessing, by the client after a page refresh, the updated sequence number from the local storage.

10. The method of claim 1, wherein generating the validation cookie information comprises:

receiving, by the client, a validation cookie and the sequence number from the device; and obtaining, by the client using the cookie engine, a hash-based message authentication code (HMAC) of the validation cookie and the sequence number.

11. The method of claim 10, comprising:

obtaining, by the client, the updated sequence number by incrementing the sequence number; and causing the device to validate the HMAC and the updated sequence number.

12. The method of claim 1, comprising:

causing the device to remove the validation cookie information from the HTTP message and to communicate the HTTP message with the authentication cookie to the server, responsive to successful validation of the authentication cookie.

13. The method of claim 1, wherein the device is intermediary between the client and the server.

14. A client comprising:

a memory;

at least one processor configured to:

receive, from a device, an authentication cookie for access to a server, the device maintaining a sequence number and a cryptographic secret;

receive, from the device, a cookie engine, the cookie engine being executable code that when executed generates validation cookie information;

generate, using the cryptographic secret and the cookie engine, validation cookie information with an updated sequence number increased by the client by a predetermined defined value responsive to generating the validation cookie information; and send, to the device via a hypertext transfer protocol (HTTP) message, the authentication cookie, and the validation cookie information with the updated sequence number to validate the authentication cookie.

15. The client of claim 14, wherein the cookie engine is received via a HTTP message from the device.

16. The client of claim 14, wherein the at least one processor is configured to generate the validation cookie information by:

modifying, using the cryptographic secret and the cookie engine, a cookie generated by the device, into the validation cookie information which comprises a validation cookie.

17. The client of claim 14, wherein the at least one processor is configured to generate the validation cookie information by:

generating, using the cryptographic secret and the cookie engine, the validation cookie information which comprises a validation cookie.

18. The client of claim 14, wherein the HTTP message comprises a HTTP GET message, a HTTP INFO message, or a HTTP HEAD message.

19. The client of claim 14, wherein the at least one processor is configured to generate the validation cookie information with the updated sequence number by:

incrementing the sequence number by a defined value.

20. The client of claim 14, wherein the at least one processor is configured to generate, using the cryptographic secret and the cookie engine, at each of a plurality of time instances, a respective validation cookie information with a respective updated sequence number.

21. A method comprising:

sending, by a device to a client, an authentication cookie for access to a server, the device maintaining a sequence number and a cryptographic secret;

sending, by the device to the client, a cookie engine, the cookie engine being executable code that when executed generates validation cookie information, wherein the validation cookie information is generated with an updated sequence number at the client using the cryptographic secret and the cookie engine;

receiving, by the device from the client via a hypertext transfer protocol (HTTP) message, the authentication cookie, and the validation cookie information with the updated sequence number increased by the client by a predetermined defined value responsive to generating the validation cookie information; and determining, by the device according to the validation cookie information and the updated sequence number, whether to validate the authentication cookie.

22. The method of claim 21, comprising:

injecting, by the device, the executable code of the cookie engine into another HTTP message, wherein sending, by the device to the client, the cookie engine comprises sending the another HTTP message.

23. The method of claim 21, comprising:

sending, by the device responsive to initiation of a new secure connection at the client, a redirect to the client; and causing, via the redirect, the client to generate the validation cookie information with the updated sequence number.

24. The method of claim 21, comprising:

removing, by the device, the validation cookie information from the HTTP message responsive to successful validation of the authentication cookie; and communicating, by the device, the HTTP message with the authentication cookie to the server.

* * * * *